United States Patent
Zhu et al.

(10) Patent No.: US 11,752,581 B2
(45) Date of Patent: Sep. 12, 2023

(54) MULTI-PURPOSE HEAT SINK, METHOD OF MANUFACTURING THE SAME, BOARD CARD, AND MULTI-PURPOSE HEAT SINK PLATFORM

(71) Applicant: Cambricon Technologies Corporation Limited, Beijing (CN)

(72) Inventors: Chongxing Zhu, Beijing (CN); Huijun Lan, Beijing (CN); Kun He, Beijing (CN); Kai Ye, Beijing (CN); Deheng Chen, Beijing (CN); Shuai Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 110 days.

(21) Appl. No.: 16/714,678

(22) Filed: Dec. 13, 2019

(65) Prior Publication Data
US 2020/0376614 A1  Dec. 3, 2020

(30) Foreign Application Priority Data
May 31, 2019 (CN) .......................... 201910471371.0

(51) Int. Cl.
*F28F 7/00* (2006.01)
*B23P 15/26* (2006.01)
(Continued)

(52) U.S. Cl.
CPC ................ *B23P 15/26* (2013.01); *F28F 3/12* (2013.01); *B23P 2700/10* (2013.01);
(Continued)

(58) Field of Classification Search
CPC ..... B23P 15/26; F28F 3/12; F28F 3/14; F28D 15/0275; F28D 2021/0029;
(Continued)

(56) References Cited

U.S. PATENT DOCUMENTS 6,683,788 B2 * 1/2004 Lee ...................... H01L 23/4093
174/16.3
7,495,917 B2 * 2/2009 Li .......................... H01L 23/467
165/185
(Continued)

FOREIGN PATENT DOCUMENTS

CN     102163910 A     8/2011
CN     102709262 A     10/2012
(Continued)

OTHER PUBLICATIONS

EP 20166558.5—Extended European Search Report, dated Oct. 6, 2020, 8 pages.
(Continued)

*Primary Examiner* — Claire E Rojohn, III
(74) *Attorney, Agent, or Firm* — Getech Law LLC; Jun Ye (57) ABSTRACT

The present disclosure provides a multi-purpose heat sink, a method of manufacturing the same, a board card, and a multi-purpose heat sink platform, where the multi-purpose heat sink is composed of a bracket (310) and heat dissipation components. The cost of the multi-purpose heat sink in the present disclosure is low.

13 Claims, 9 Drawing Sheets

(51) Int. Cl.
*F28F 3/12* (2006.01)
*F28D 15/02* (2006.01)
*F28D 21/00* (2006.01)

(52) U.S. Cl.
CPC .. *F28D 15/0275* (2013.01); *F28D 2021/0029* (2013.01); *F28F 2215/00* (2013.01)

(58) Field of Classification Search
CPC ..... F28D 2021/0031; F28D 2021/0028; H01L 23/34; H05K 7/20
USPC ................................................ 165/80.3, 80.4
See application file for complete search history.

(56) References Cited

U.S. PATENT DOCUMENTS

| | | | |
|---|---|---|---|
| 9,013,874 B2 * | 4/2015 | Kaldani | F28F 3/048 361/679.52 |
| 9,894,803 B1 * | 2/2018 | Artis | H01L 23/467 |
| 10,031,565 B1 * | 7/2018 | Han | H01L 23/427 |
| 2003/0151899 A1 | 8/2003 | Lee et al. | |
| 2005/0073811 A1 * | 4/2005 | Wang | H01L 23/467 361/709 |
| 2006/0267192 A1 | 11/2006 | Chen | |
| 2009/0180254 A1 | 7/2009 | McGough | |
| 2010/0018670 A1 * | 1/2010 | Azar | H01L 23/4093 165/185 |
| 2014/0014303 A1 * | 1/2014 | Rice | F28D 15/0275 165/104.21 |
| 2015/0174709 A1 * | 6/2015 | Rice | F28D 15/0275 29/890.038 |
| 2018/0168066 A1 * | 6/2018 | Xu | H05K 7/20154 |
| 2020/0265178 A1 * | 8/2020 | Hodes | F28F 13/06 |
| 2020/0376614 A1 * | 12/2020 | Zhu | B23P 15/26 |

FOREIGN PATENT DOCUMENTS

| | | |
|---|---|---|
| CN | 104812214 A | 7/2015 |
| CN | 206160074 U | 5/2017 |
| EP | 2495760 A2 | 9/2012 |
| EP | 2495760 A3 | 9/2012 |

OTHER PUBLICATIONS

EP 20166558.5—Article 94(3) EPC, dated Oct. 19, 2021, 6 pages.
CN201910471371.0—Chinese Office Action dated Dec. 5, 2022, 11 pages. (With brief English explanation).
CN201910471371.0—Office Action dated Mar. 31, 2023, 9 pages. (With Brief English Translation).
EP20166558.5—Communication under Rule 71(3) EPC dated Mar. 13, 2023, 38 pages.
EP20166558.5—Decision to grant a European patent pursuant to Article 97(1) EPC dated Apr. 6, 2023, 2 pages.

* cited by examiner

MULTI-PURPOSE HEAT SINK, METHOD OF MANUFACTURING THE SAME, BOARD CARD, AND MULTI-PURPOSE HEAT SINK PLATFORM

TECHNICAL FIELD

The disclosure relates to the field of electronic device technologies, and specifically to a multi-purpose heat sink, a method of manufacturing the same, a board card, and a multi-purpose heat sink platform.

BACKGROUND

A Printed Circuit Board Assembly (PCBA) integrates a plurality of electronic parts that generate heat. The heat dissipation sources (or "heat sources") is mainly some high-power-density integrated circuits (ICs) or memory granules. If the heat is not dissipated, it may affect system stability and even cause downtime.

At present, the general heat dissipation method is to manufacture a heat sink for each type of board card corresponding to the circuit board of the board card. Since the positions of a plurality of heat sources are different on each circuit board, the heat sinks need to match the position and height of the convex plate according to different heat sinks.

The disadvantage of the above heat dissipation method is that each type of board card needs a type of brand new heat sink, which needs a long research and development (R & D) cycle, a long processing cycle, and a high cost.

SUMMARY

The present disclosure is intended to provide a multi-purpose heat sink, a method of manufacturing the same, a board card, and a multi-purpose heat sink platform to solve the above-mentioned technical problems.

Solution 1: a manufacturing method of a multi-purpose heat sink, comprising:
providing a platform part (300), wherein the platform part (300) includes a bracket (310) and heat dissipation components, and the bracket (310) limits a frame of the platform part (300) and includes a primary panel (311); and
providing an additional part (400), where the additional part (400) includes a plurality of convex plates, in particular, a plurality of convex plates of different sizes and/or thicknesses; wherein at least part of the heat dissipation components are set on a back side of the primary panel (311) of the bracket (310), and the plurality of convex plates are combined with a front side of the primary panel (311) and are used for heat conduction in contact with heat dissipation sources of a corresponding circuit board assembly (100); the platform part (300) is configured to be universal for a variety of heat sinks, and the plurality of convex plates are prepared and/or selected according to an arrangement of the heat dissipation sources of the corresponding circuit board assembly (100).

Solution 2: the manufacturing method of solution 1, wherein the platform part (300) further includes a cover (330) installed to the back side of the bracket (310), so that at least part of the heat dissipation components may be clamped on the cover (330) and the primary panel (311).

Solution 3: the manufacturing method of solution 1, wherein the heat dissipation components include heat fins (340, 314, and 315).

Solution 4: the manufacturing method of solution 3, wherein the heat dissipation components further include a plurality of heat pipes (350), the heat fins (340, 314, 315) include a first heat fin (340), where the plurality of heat pipes (350) are set between the first heat fin (340) and the primary panel (311), and the plurality of heat pipes (350) are in contact with the first heat fin (340).

Solution 5: the manufacturing method of any one of solutions 1-4, wherein the heat dissipation components further include a heat conducting plate (360) for contacting and conducting heat with a primary chip of the corresponding circuit board assembly (100).

Solution 6: the manufacturing method of any one of solutions 1-5, wherein the platform part (300) further includes a support ring (320) for providing strength support to the heat dissipation components.

Solution 7: the manufacturing method of solution 6, wherein the heat dissipation components further include a heat conducting plate (360) for contacting and conducting heat with a primary chip of the corresponding circuit board assembly (100), the material strength of the support ring (320) is greater than the material strength of the heat conducting plate (360), the support ring (320) is set around the heat conducting plate (360), and a thermal conductivity of the heat conducting plate (360) is greater than a thermal conductivity of the support ring (320).

Solution 8: the manufacturing method of solution 6 or solution 7, wherein the primary panel (311) is provided with a raised part (311S) raised toward the corresponding circuit board assembly (100), and the support ring (320) is clamped between the raised part (311S) and the heat dissipation components.

Solution 9: the manufacturing method of any one of solutions 1-4, wherein the additional part (400) further includes a heat conducting plate (360) for contacting and conducting heat with a primary chip of the corresponding circuit board assembly (100).

Solution 10: the manufacturing method of any one of solutions 1-9, wherein the support ring (320) or the heat dissipation components are provided with a plurality of convex columns (321), the primary panel (311) is correspondingly provided with a plurality of installation holes (317), and the convex columns (321) pass through the installation holes (317) and allow the heat dissipation components to float in a thickness direction (H) of the multi-purpose heat sink.

Solution 11: the manufacturing method of solution 10, wherein the plurality of convex columns (321) are provided with threaded holes for installing to a corresponding circuit board assembly (100) by screws.

Solution 12: the manufacturing method of any one of solutions 1-11, wherein
the plurality of convex plates are welded to the primary panel (311) by solder paste or laser.

Solution 13: the manufacturing method of any one of solutions 1-11, wherein
the plurality of convex plates are glued to the primary panel (311) by heat conductive adhesive.

Solution 14: the manufacturing method of any one of solutions 1-13, wherein at least one of the plurality of convex plates (411) includes a base-plate (411A) and a plurality of convex part (411B), wherein the plurality of convex parts (411B) have a surface area substantially equal to that of a plurality of heat dissipation sources (121) set side by side, and protrude from the base-plate (411A), and are respectively used to contact the plurality of heat dissipation sources (121), the base-plate (411A) is used to be combined with the primary panel (311).

Solution 15: a multi-purpose heat sink, comprising:

a platform part (300), where the platform part (300) includes a bracket (310) and heat dissipation components, and the bracket (310) limits a frame of the platform part (300) and includes a primary panel (311); and an additional part (400), where the additional part (400) includes a plurality of convex plates, in particular, a plurality of convex plates of different sizes and/or thicknesses; at least part of the heat dissipation components are set on a back side of the primary panel (311) of the bracket (310), and the plurality of convex plates are combined with a front side of the primary panel (311) and are used for heat conduction in contact with heat dissipation sources of a corresponding circuit board assembly (100); the platform part (300) is configured to be universal for a variety of heat sinks, and the plurality of convex plates are prepared and/or selected according to an arrangement of the heat dissipation sources of the corresponding circuit board assembly (100).

Solution 16: a multi-purpose heat sink, comprising:

a platform part (300), where the platform part (300) includes a bracket (310) and heat dissipation components, and the bracket (310) limits a frame of the platform part (300) and includes a primary panel (311); and an additional part (400), where the additional part (400) includes a plurality of convex plates, in particular, a plurality of convex plates of different sizes and/or thicknesses; at least part of the heat dissipation components are set on a back side of the primary panel (311) of the bracket (310), and the plurality of convex plates are welded or glued to a front side of the primary panel (311) and are used for heat conduction in contact with heat dissipation sources of a corresponding circuit board assembly (100).

Solution 17: the multi-purpose heat sink of solution 15 or 16, wherein the multi-purpose heat sink is manufactured according to the method of manufacturing a multi-purpose heat sink of any one of solutions 1-14.

Solution 18: a board card, comprising:

a circuit board assembly (100); and the multi-purpose heat sink of any one of solutions 15-17.

Solution 19: a multi-purpose heat sink platform, comprising:

a bracket (310) and heat dissipation components, wherein the bracket (310) limits a frame of the platform part (300) and includes a primary panel (311), and at least part of the heat dissipation components are set on a back side of the primary panel (311) of the bracket (310); a front side of the primary panel (311) is used to install a plurality of convex plates (a plurality of convex plates of different sizes and/or thicknesses in particular) by welding or gluing, and the plurality of convex plates are used for heat conduction in contact with heat dissipation sources of a corresponding circuit board assembly (100).

Solution 20: the multi-purpose heat sink platform of solution 19, wherein the multi-purpose heat sink platform is the platform part (300) in the method of manufacturing a multi-purpose heat sink of any one of solutions 1-14.

The method of manufacturing a multi-purpose heat sink provided by the present disclosure may shorten the R & D and manufacturing cycle. Compared with developing and manufacturing a brand new heat sink, in the present disclosure, a common platform part can be used and only additional parts need to be developed and manufactured, so that the entire R & D and manufacturing cycle can be greatly shortened. Besides, cost savings can be achieved through high-volume production of the platform parts.

DESCRIPTION OF MARKS OF DRAWINGS

100: circuit board assembly; 110: circuit board; 120, 121, 122, 123, 124, 125, 126, 130: heat dissipation source; 140, 150: installation hole; 160: raised part of a circuit board assembly; 200: heat sink; 300: platform part; 310: bracket; 311: primary panel; 311A: first opening; 311B: second opening 311S: raised part of a primary panel; 312, 313: side panel; 314: second heat fin; 315: third heat fin; 316: threaded column; 317: installation hole; 318: threaded hole;

320: support ring; 321: convex column; 330: cover; 331: screw; 340: heat fin (first heat fin)

341: groove; 350: heat pipe; 360: heat conducting plate; 370: elastic member;

400: additional part; 411, 412, 413, 414, 415, 416: convex plate; 411A: base-plate; 411B: convex part;

L: length direction; W: width direction; H: thickness direction

DETAILED DESCRIPTION OF THE EMBODIMENTS

Exemplary embodiments of the present disclosure will be described below with reference to the drawings. It should be understood that these specific descriptions are only used to teach those skilled in the art how to implement the present invention, not to exhaust all possible ways of the present invention, nor to limit the scope of the present invention.

Figure 1:
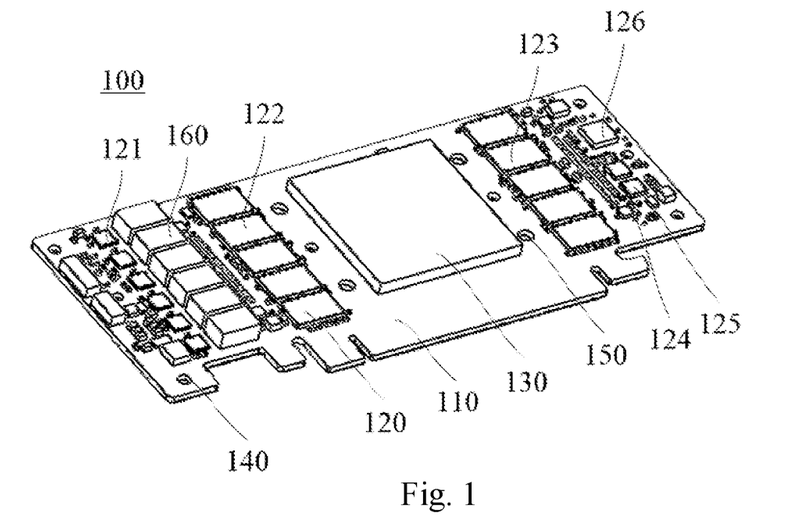
FIG. 1 is a structural diagram of a circuit board assembly according to an embodiment of the present disclosure.

FIG. 1 is a structural diagram of a circuit board assembly 100 which includes a printed circuit board (PCB, sometimes simply referred to as a "circuit board") 110 and heat dissipation sources installed on the circuit board 110. These heat dissipation sources include a first heat dissipation source 120 and a second heat dissipation source 130. The first heat dissipation source 120 includes heat dissipation sources 121, 122, 123, 124, 125, and 126. For example, the heat dissipation source 121 may be a power management chip, the heat dissipation sources 122 and 123 may be memory granules, and the heat dissipation source 125 may be a power management chip or other chips with high heat generation. The second heat dissipation 130 may be a primary chip, for example, a central processing unit (CPU), a graphics processor (GPU), an application specific integrated circuit (ASIC) chip, etc.

In addition, the circuit board 110 is provided with a plurality of installation holes 140 and 150 for connecting with the heat sink. The circuit board assembly 100 and the heat sink can be installed together through the installation holes 140 and 150 to form a board card by means of screws or clips, etc.

As shown in FIG. 2-FIG. 9, the embodiments of the present disclosure provide a multi-purpose heat sink 200, a method of manufacturing the same, a multi-purpose heat sink platform (that is, a platform part 300), and a board card including the multi-purpose heat sink 200 and a circuit board assembly.

In the following description, a side of the multi-purpose heat sink 200 facing the circuit board assembly is referred to as the front side, and a side of the multi-purpose heat sink 200 remote from the circuit board assembly is referred to as the back side.

Figure 2:
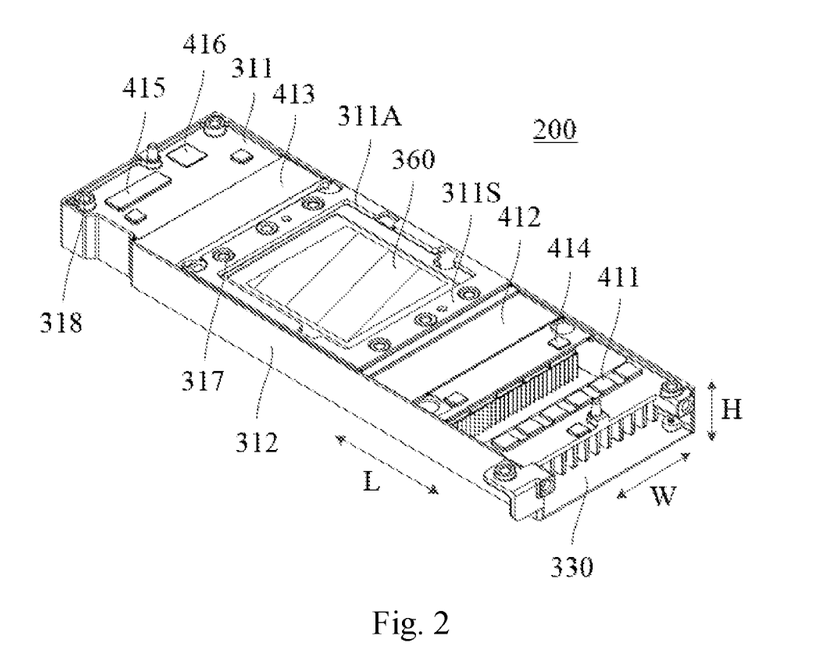
FIG. 2 is a structural diagram of a heat sink according to an embodiment of the present disclosure.
Figure 3:
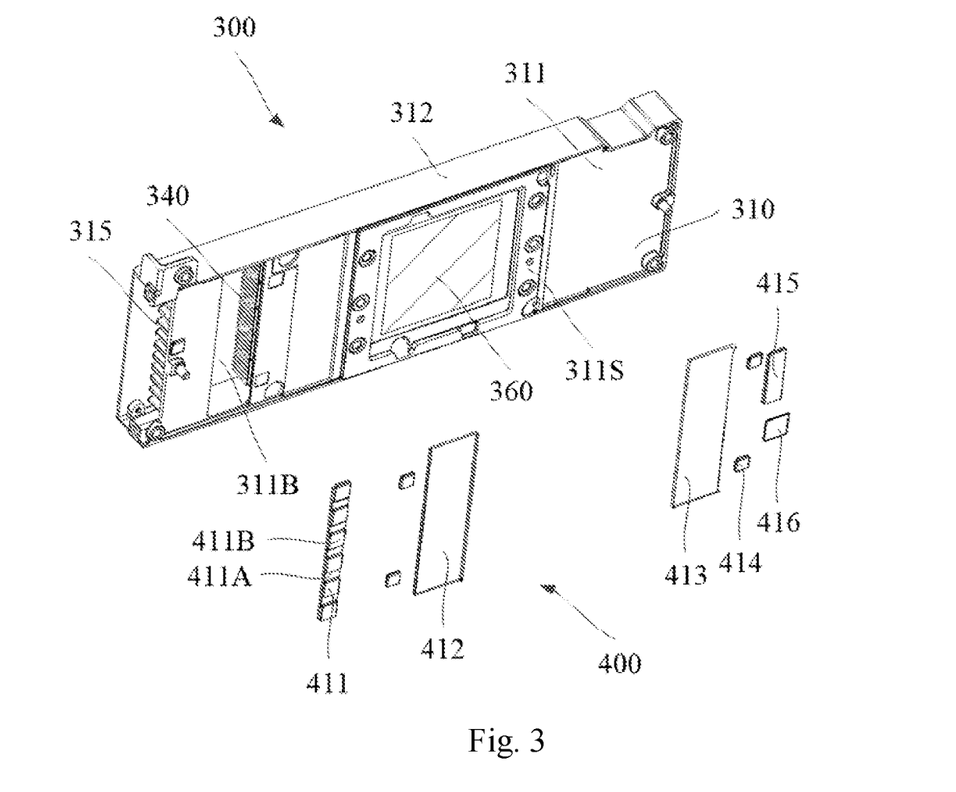
FIG. 3 is diagram of the decomposition of the heat sink in FIG. 2.
Figure 4A:
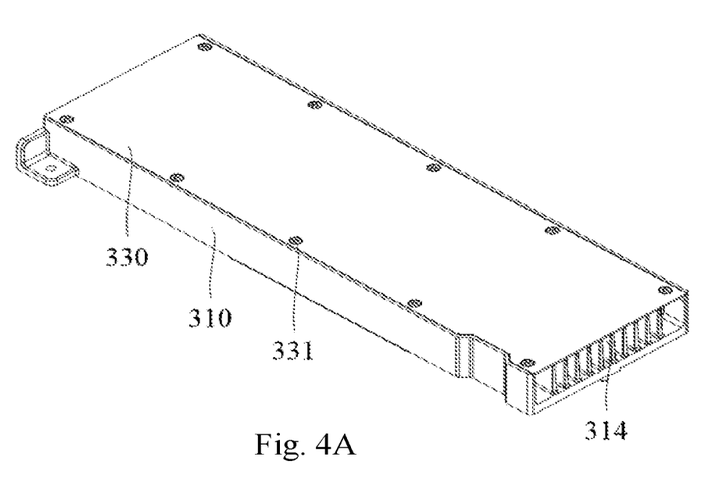
FIG. 4A and FIG. 4B are diagrams of the heat sink in FIG. 2 as viewed from the back, wherein a cover is omitted in FIG. 4B.
Figure 4B:
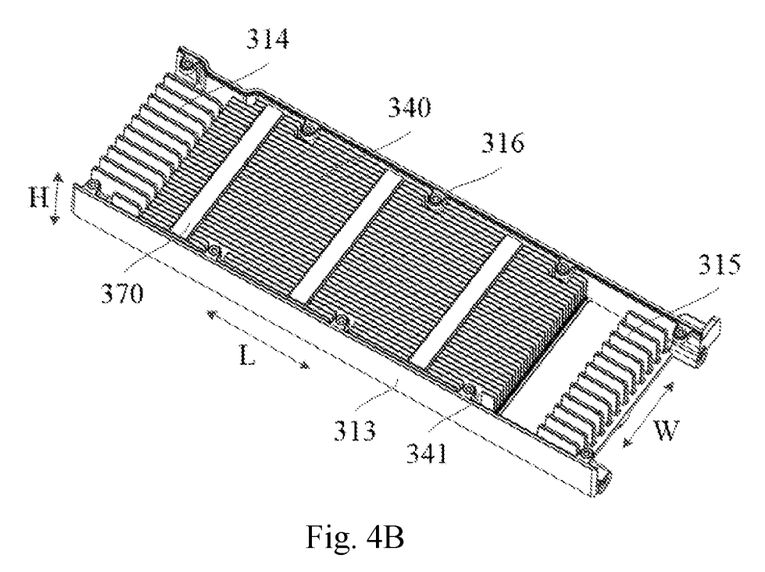
Figure 5:
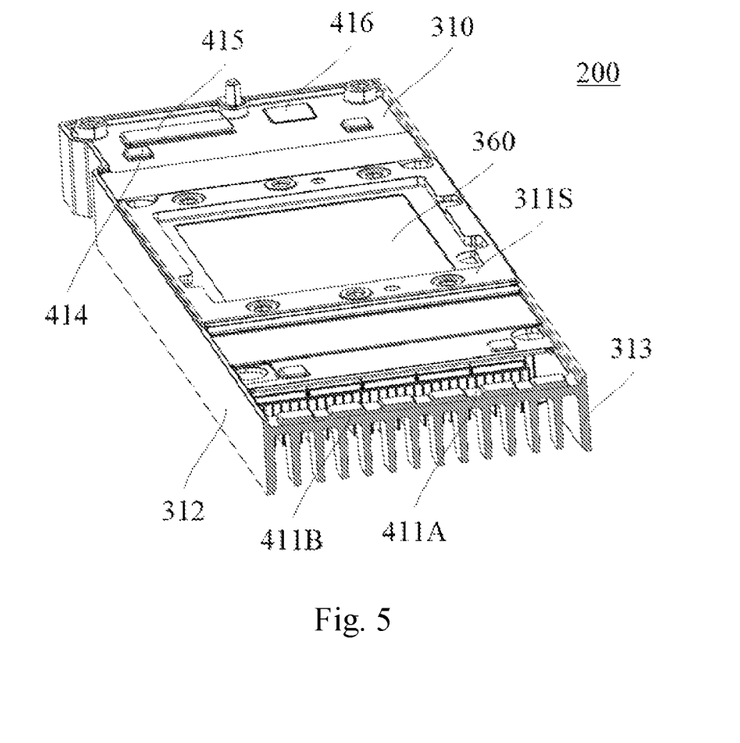
FIG. 5 and FIG. 6 are two sectional stereograms of the heat sink in FIG. 2.
Figure 6:
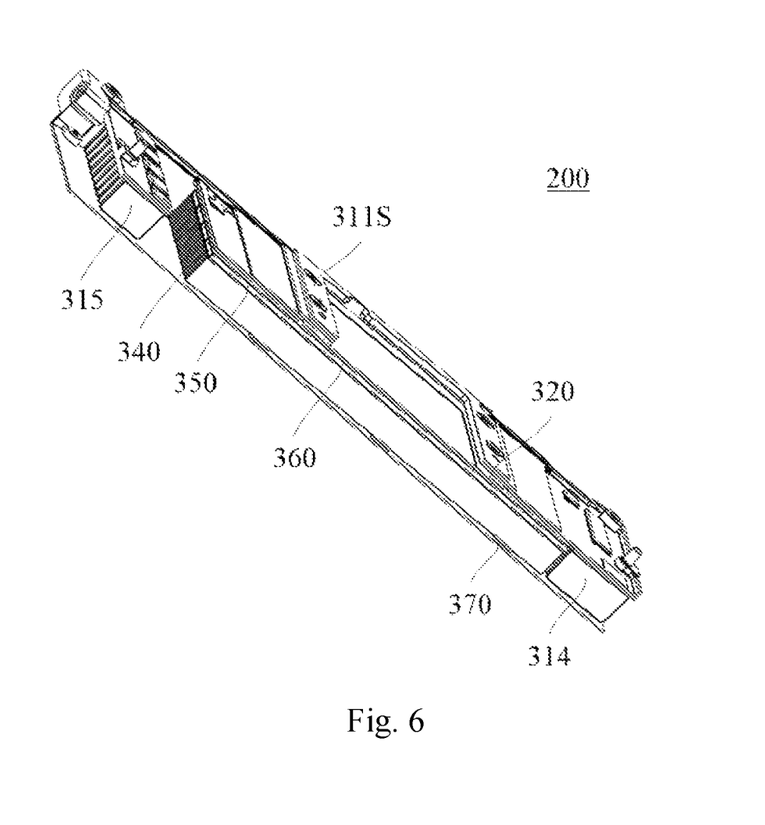
Figure 7:
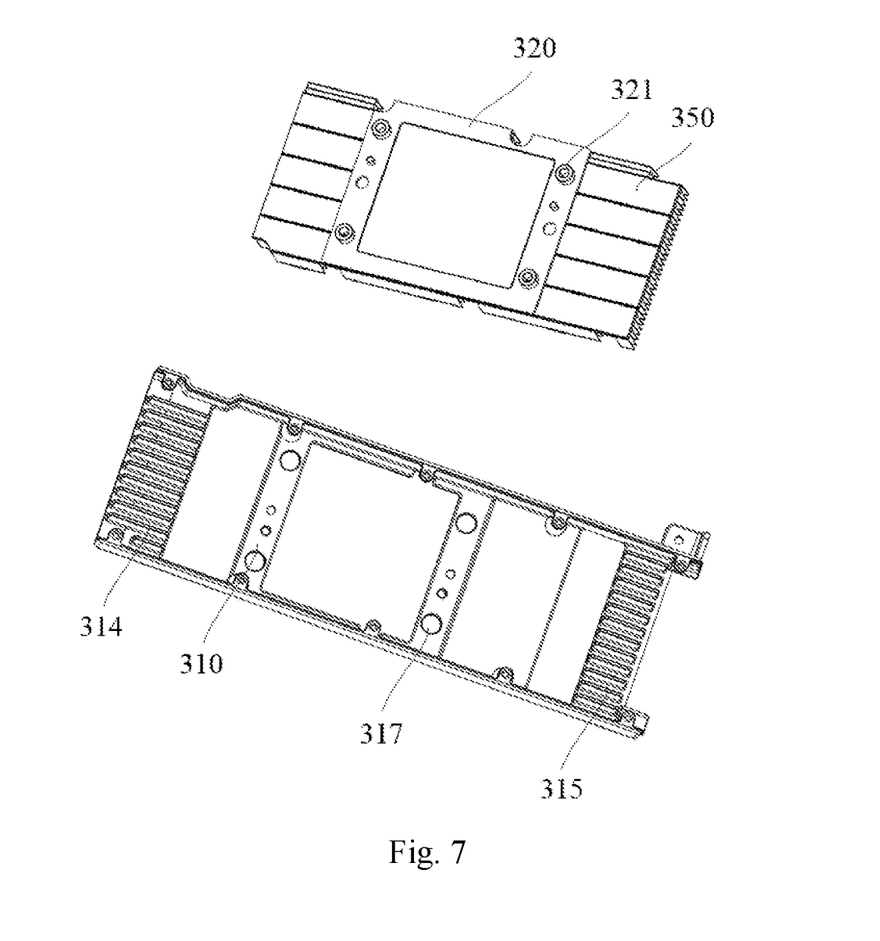
FIG. 7, FIG. 8, and FIG. 9 are diagrams of the decomposition of the heat sink in FIG. 2, wherein some components such as a cover, a complex plate are omitted.
Figure 8:
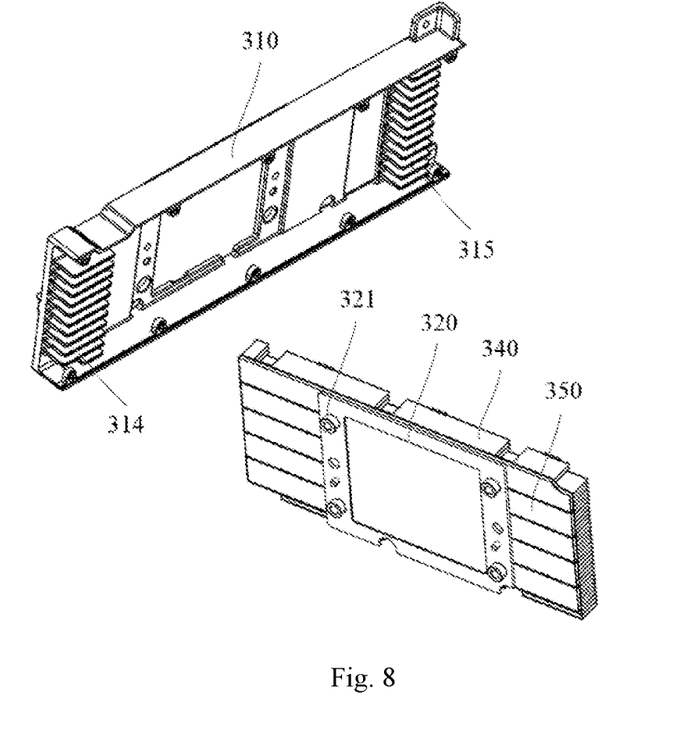
Figure 9:
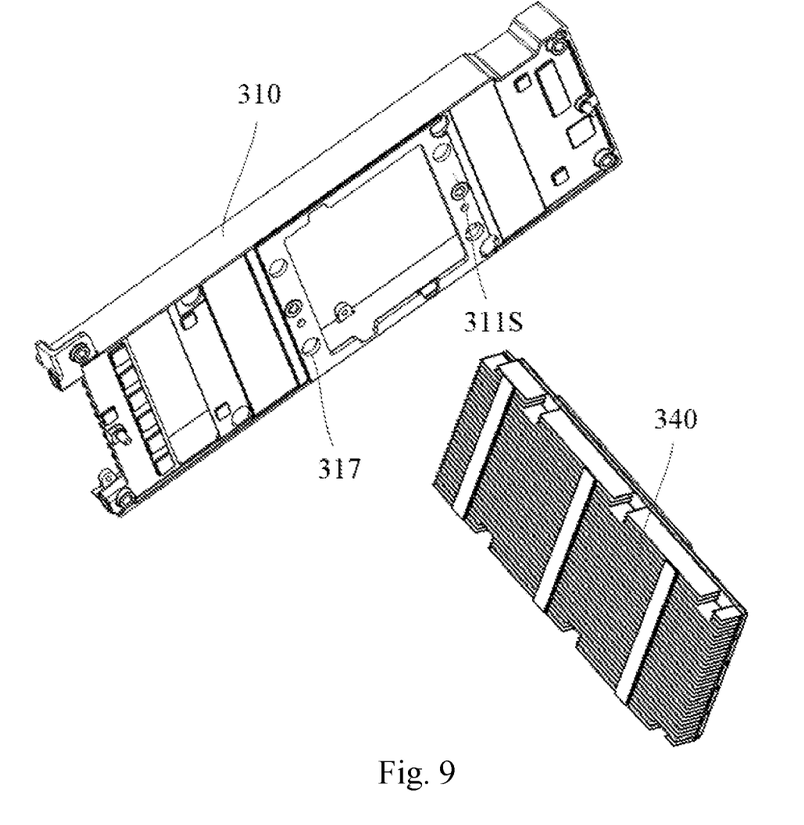

As shown in FIG. 2 and FIG. 3, in the embodiment of the present disclosure, the multi-purpose heat sink 200 (sometimes simply referred to as "heat sink 200") includes a platform part 300 and an additional part 400. In the technical solution of the present disclosure, different additional parts 400 can be installed on the same platform part 300 to obtain a heat sink 200 suitable for different circuit board assemblies. In other words, the platform part 300 may be shared, and the additional part 400 is manufactured in cooperation with each circuit board assembly. In this technical solution, by simply modifying the additional part 400, the heat sink 200 can be matched to different circuit board assemblies.

As shown in FIG. 2 and FIG. 3, the platform part 300 may be a basic platform part that meets the requirements of a standard heat sink, for example, the platform part 300 may meet PCIE (Peripheral Component Interconnect Standard) specifications. The additional part 400 may be adjusted according to the position and height of different heat dissipation sources.

In the technical solution of the present disclosure, the additional part 400 and the platform part 300 can be fully combined by welding. For example, by using the solder paste or laser, the additional part 400 can be firmly welded to the platform part 300. At the same time, the flatness of the additional part 400 can be guaranteed, so as to ensure that the additional part 400 can be in full contact with the heat dissipation sources of the circuit board assembly, thereby ensuring the heat dissipation effect.

The method of combining the additional part 400 and the platform part 300 is not limited to welding. For example, the additional part 400 may be glued to the platform part 300 by a heat conductive adhesive. The heat conductive adhesive has fast surface drying and curing speed, high flame retardant grade, and has good thermal conductivity (heat dissipation) while playing an adhesive role.

Referring to FIG. 2 to FIG. 9, the platform part 300 may include a bracket 310, a support ring (or "auxiliary ring") 320 (please refer to FIG. 6 to FIG. 8), a cover 330, and a heat fin (a first heat fin) 340 (please refer to FIG. 4B and FIG. 9), a heat pipe 350 (please refer to FIG. 6 to FIG. 8), and a heat conducting plate 360. The bracket (310) limits a frame of the entire platform part (300) and an installation space of the additional part 400.

The bracket 310 may be stamped from a thermally conductive material such as aluminum, and the bracket 310 may include a primary panel 311 and two side panels 312 and 313. The primary panel 311 extends along the length direction L and the width direction W of the platform part 300 and limits an installation space of the additional part 400. The primary panel 311 may be on one plane, or may include multiple planes. For example, the primary panel 311 may be raised away from the cover plate 330 at the support ring 320 to form a raised part 311S, thereby accommodating a support ring 320 between a heat fin 340 and a raised part 311S of the primary panel 311. More specifically, the support ring 320 is accommodated between a heat pipe 350 and the raised part 311S of the primary panel 311. The height of the raised part 311S from other surface parts of the primary panel 311 may be about 1.0 mm. The raised part 311S may be in contact with, for example, the circuit board 110 in FIG. 1. The setting of the raised part 311S makes that at least the part on the back side of the primary panel 311 in contact with the heat pipe 350 is in the same plane even if the supporting ring 320 is set, which increases the heat conduction area of the primary panel 311 and the heat pipe 350, and improves the heat dissipation effect.

The front side of the raised part 311S may also be provided with one layer of insulating material board or insulating coating, which can prevent conductive contact with the circuit board 110, thus preventing the occurrence of short circuit.

The bracket 310 may also be formed by die casting using a mold and/or milled by a CNC machine tool.

The primary panel 311 may include a first opening 311A, and the first opening 311A may be set at the raised part 311S and surrounded by the raised part 311S of the approximate mouth shape. The first opening 311A may be used to place, for example, the second heat dissipation source 130 shown in FIG. 1.

It can be understood that, in other embodiments, the platform part 300 may not include the support ring 320, so that the primary panel 311 may not be raised at the support ring 320. In some other embodiments, the raised part 311S of the primary panel 311 may be removed to expose the support ring 320 on the surface side of the primary panel 311.

The primary panel 311 may include a second opening 311B, and the second opening 311B may be used to avoid, for example, a raised part 160 on the circuit board assembly 100 shown in FIG. 1. The raised part 160 may be, for example, an inductive element or an inductor. The second opening 311B may also be used to reduce the weight of the bracket 310 and the platform part 300.

The side panels 312 and 313 extend substantially along the length direction L and the thickness direction H of the platform part 300 and limit an installation space of a heat fin 340.

In an embodiment, the bracket 310 may have a length of about 167.5 mm, a width of about 62.7 mm, and a thickness of about 17.5 mm.

In a possible embodiment, the bracket 310 may further include a second heat fin 314 and a third heat fin 315 formed at both ends in the length direction L. Both the second heat fin 314 and the third heat fin 315 may include a plurality of heat dissipation fins arranged in the width direction W or the length direction L. It should also be understood that the second heat fin 314 and the third heat fin 315 may also be independently formed with the bracket 310 and installed to the bracket 310. A plurality of heat fins (340, 314, 315) are formed separately to achieve thermal insulation (physical insulation). For example, the first heat fin 340 may correspond to the second heat dissipation source 130 (such as the primary chip) and some other heat dissipation sources (such as a heat dissipation source 122 and a heat dissipation source 123), and the second heat fin 314 and the third heat fin 315 may correspond to remaining heat sources.

The heat fin 340 is located between the second heat fin 314 and the third heat fin 315 in the length direction L and avoids the second opening 311B. The heat fin 340 may include a plurality of heat dissipation fins arranged along the length direction L or the width direction W.

The plurality of heat pipes 350 may extend along the length direction L and be arranged along the width direction W. A plurality of heat pipes 350 are set between the heat fin 340 and the primary panel 311 of the bracket 310, and are configured to efficiently conduct heat from the side of the primary panel 311 of the bracket 310 to the heat fin 340. The heat pipe 350 and the heat fin 340 may be welded together.

The heat conducting plate 360 is set in the first opening 311A and is located on the front side of the heat pipe 350. The heat conducting plate 360 is used for conducting heat by contacting with, for example, the second heat dissipation source 130 in FIG. 1. The heat conducting plate 360 may be a rectangular flat plate and may be made of highly thermally conductive materials. The heat conducting plate 360 can be in surface contact with, for example, the second heat dissipation source 130 of the primary chip, to provide better thermal conductivity. The heat conducting plate 360 and the heat pipe 350 may be welded together.

In the embodiment of the present disclosure, the heat conducting plate 360 is surrounded by the support ring 320. The inner dimension of the support ring 320 is roughly the same as the outer dimension of the heat conducting plate 360, so that they can be nested. The material strength of the support ring 320 is preferably greater than the material strength of the heat conducting plate 360, and the thermal conductivity of the heat conducting plate 360 may be greater than the thermal conductivity of the support ring 320. For example, the support ring 320 may be made of steel, and the heat conducting plate 360 may be made of copper. It can be understood that the support ring 320 is mainly used to support the heat dissipation components, and enable the entire platform part 300 to have enough strength.

A cover 330 may be installed to the back of the bracket 310 by a plurality of screws 331. The bracket 310 is provided with a plurality of protruding threaded columns 316, where the plurality of threaded columns 316 are set on the inner side in the width direction W of the two side panels 312, 313, and threaded holes are set in the plurality of threaded columns 316. The cover 330 is fixed to the bracket 310 by screwing screws 331 into threaded holes in the threaded columns 316.

The heat fin 340 is provided with a groove 341 that avoids the threaded columns 316. Through the cooperation of the groove 341 and the threaded columns 316, the heat fin 340 is positioned relative to the bracket 310 in the length direction L and the width direction W.

After the cover 330 is installed to the bracket 310, the heat fin 340 is clamped between the primary panel 311 and the cover 330 in the thickness direction H. In this technical solution, a plurality of elastic members 370 may be set between the heat fin 340 and the cover 330, so that the heat fin 340 can be more stably clamped between the primary panel 311 and the cover 330 in the thickness direction H. The elastic members 370 may be, for example, sponge strips. The elastic members 370 can prevent the wind from escaping from the back side of the heat fin 340 to achieve a good heat dissipation effect. In addition to being used for positioning the heat fin 340 relative to the bracket 310, the cover 330 can be used for decoration.

The additional part 400 may include a plurality of convex plates, where the convex plates may be in the form of heat conducting plates. The plurality of convex plates can be made of metals (including metal alloy) with good thermal conductivity, such as copper or aluminum. The convex plates may be used to contact, for example, the first heat dissipation source 120 in FIG. 1 to conduct the heat from the first heat dissipation source 120 to the platform part 300.

It should be understood that, in other embodiments, the convex plates may also be used to contact the second heat dissipation source 130, so as to conduct the heat from the second heat dissipation source 130 to the platform part.

The plurality of convex plates may include convex plates 411, 412, 413, 414, 415, and 416, and the plurality of convex plates may be combined to the primary panel 311 of the bracket 310 by welding or bonding. To match different heat dissipation sources on the circuit board assembly, the plurality of convex plates can be of different sizes and/or thicknesses.

The convex plate 411 may be used to conduct heat by contact with the heat dissipation sources 121 shown in FIG. 1. The convex plate 411 may be composed of a base-plate 411A and a plurality of convex parts 411B, where the plurality of convex parts 411B have the surface areas substantially equal to the surface areas of a plurality of heat dissipation sources 121 and protrude from the base-plate 411A for direct contact with the plurality of heat dissipation sources 121. The base-plate 411A is used to be combined to the primary panel 311 of the bracket 310. For example, the base-plate 411A can be welded to the primary panel 311 in the gap between the plurality of convex parts 411B, so that deformation of the convex parts 411B can be avoided, and the gap between the plurality of convex parts 411B can also be used for ventilation and heat dissipation. The convex plate 411 may have a width of about 5.6 mm and a length of about 48.2 mm. The length direction of the convex plate 411 may be consistent with the width direction W of the platform part 300 of the heat sink 200.

The convex plate 412 may be used to conduct heat by contact with the heat dissipation sources 122 shown in FIG. 1. The convex plate 412 may have a rectangular plate shape so as to be in direct contact with the plurality of heat dissipation sources 122 at the same time. The convex plate 412 may have a width of about 15.0 mm, a length of about 52.0 mm, and a thickness of about 1.2 mm. The length direction of the convex plate 412 may be consistent with the width direction W of the platform part 300 of the heat sink 200.

The convex plate 413 may be used to conduct heat by contact with the heat dissipation sources 123 shown in FIG. 1. The convex plate 413 may have a rectangular plate shape so as to be in direct contact with the plurality of heat dissipation sources 123 at the same time. The convex plate 413 may have a width of about 14.7 mm, a length of about 52.2 mm, and a thickness of about 1.4 mm. The length direction of the convex plate 413 may be consistent with the width direction W of the platform part 300 of the heat sink 200.

The convex plates 414 may be used to conduct heat by contact with the heat dissipation sources 124 shown in FIG. 1. A plurality of convex plates 414 may have a rectangular plate shape so as to be in direct contact with the plurality of heat dissipation sources 124 at the same time. The convex plates 414 may have a width of about 4.6 mm, a length of about 4.6 mm, and a thickness of about 0.8 mm.

The convex plate 415 may be used to conduct heat by contact with the heat dissipation sources 125 shown in FIG. 1. The convex plate 415 may have a rectangular plate shape so as to be in direct contact with two heat dissipation sources 125 at the same time. The convex plate 415 may have a width of about 6.0 mm, a length of about 18.5 mm, and a thickness of about 0.8 mm. The length direction of the convex plate 415 may be consistent with the width direction W of the platform part 300 of the heat sink 200.

The convex plate 416 may be used to conduct heat by contact with the heat dissipation sources 126 shown in FIG. 1. The convex plate 416 may have a rectangular plate shape so as to be in direct contact with the heat dissipation sources 126 at the same time. The convex plate 416 may have a width of about 7.7 mm, a length of about 7.7 mm, and a thickness of about 0.2 mm.

It should be understood that the size and position of the above-mentioned convex plates are merely exemplary. In this technical solution of the present disclosure, the size and position of the convex plates can be determined by the size and position of the corresponding heat dissipation source 120. Although the heat dissipation source 120 from different brands or manufacturers have different sizes, the heat dissipation source 120 from the same brand or same manufacturer usually have relatively fixed sizes. Different circuit board assemblies sometimes use multiple combinations of specific heat dissipation source 120.

In this technical solution of the present disclosure, convex plates of different sizes can be used according to the combinations of the heat dissipation source 120, therefore, a plurality of predetermined convex plates of different sizes can be commonly used for a plurality of different board cards. In this way, the manufacturers can produce a large number of platform parts 300 at a time, manufacture and/or combine some appropriate additional parts 400 (convex plates) for different board cards, so that the heat sink 200 can be produced in a short time to match the desired circuit board assembly.

It should be understood that, in the above description, the heat conducting plate 360 is used as a part of the platform part 300, which is not limited in the present disclosure. The heat conducting plate 360 can also be used as a part of the additional part 400, in this case, the heat conducting plate 360 can be used as a part of the plurality of convex plates.

The primary panel 311 may be provided with a plurality of installation holes 317. In an optional manner, a support ring 320 is provided with a plurality of convex columns 321 (please refer to FIG. 2, FIG. 7, FIG. 8, etc.), and the plurality of convex columns 321 are inserted into the installation holes 317. In the present technical solution, one convex column 321 is respectively set near each of the four corners of the rectangular ring-shaped support ring 320, which is not limited in the present disclosure. In the present technical solution, threaded holes may be set in the plurality of convex columns 321, so that a circuit board 110 can be installed to the heat sink 200 by screws and, for example, the installation holes 150 shown in FIG. 1. Since the convex columns 321 can be movably installed in the installation holes 317 along the thickness direction H, the components (such as the support ring 320, the heat pipe 350, and the heat fin 340) between the bracket 310 and the cover 330 can move (float) in the thickness direction H, which may adapt to production errors, and adapt to, for example, the second heat dissipation source 130 (such as the primary chip) of different thicknesses shown in FIG. 1.

It should be understood that the support ring 320 and the heat conducting plate 360 are not necessary. When the support ring 320 is not provided, the convex columns 321 may be set on the heat conducting plate 360; while when the heat conducting plate 360 and the support ring 320 are not provided, the convex columns 321 may be directly set on the heat fin 340 or the heat pipe 350, which can also play a role of floating and connecting with the circuit board, which is not limited in the present disclosure.

Moreover, in the present technical solution, a plurality of threaded holes 318 may be set in the primary panel 311, so that a circuit board 110 can be installed to the heat sink 200 by screws and, for example, the installation holes 140 shown in FIG. 1. Preferably, for example, as shown in FIG. 2, a plurality of convex columns are formed on the primary panel 311, and the threaded holes 318 are formed in the convex columns. The convex columns can provide support for the circuit board 110, thereby achieving stable threaded joint.

In the prior art, the convex plate and the bracket are integrally formed by, for example, die-casting, therefore, it is necessary to separately design the integrally formed convex plate and bracket, and the mold used for die-casting, for each circuit board, which results in a long development cycle and high cost.

The method of manufacturing a multi-purpose heat sink 200 provided by the present disclosure may shorten the R & D and manufacturing cycle. Compared with developing and manufacturing a brand new heat sink, in the present disclosure, a common platform part 300 can be used and only additional parts 400 need to be developed and manufactured, so that the entire R & D and manufacturing cycle can be greatly shortened.

Cost savings can be achieved through high-volume production of the platform parts 300. In the prior art, a large area is uneven due to a plurality of convex plates, while in the present disclosure, the primary panel 311 of the bracket 310 of the platform part 300 has a large-area flat surface. Therefore, whether by stamping or die-casting, the bracket 310 can be produced more simply and with higher accuracy.

Since the platform part 300 is universal and the production volume thereof is large, manufactures can improve the quality to make the final heat sinks more stable.

It should be understood that, while the multi-purpose heat sink of the present disclosure is described above, the manufacturing method of the multi-purpose heat sink of the present invention is also described. In addition to the above-mentioned heat sink, the present disclosure also provides a board card of the above-mentioned heat sink and a corresponding circuit board assembly. The platform part 300, that is, the multi-purpose heat sink platform, can also be sold separately for customers to further manufacture heat sinks. Therefore, a multi-purpose heat sink platform is also one of the subjects of the present disclosure.

It should be understood that the above-mentioned contacting or direct contacting between the convex plate and the heat dissipation source 120, and the contacting or direct contacting between the heat conducting plate 360 and the heat dissipation source 130 include: setting heat-conducting medium such as silicone grease between the convex plates and the heat dissipation sources 120, and between the heat conducting plate 360 and the heat dissipation source 130.

It should be understood that although the platform part 300 described above may include the heat fins 340, 314, 315, the heat pipe 350, and the heat conducting plate 360, they are merely examples of the heat dissipation components of the present disclosure. The heat dissipation components in the present disclosure may include, but are not limited to, one or more of a heat sink, a heat pipe, a heat conducting plate, and the like. The heat dissipation components in the present disclosure may also have other types, for example, the heat dissipation components may be flowing or non-flowing refrigerant (such as refrigerant liquid) and a heat dissipation component for containing the container of the refrigerant.

It should be understood that the heat pipe 350 may be used not only as part of the platform part 300 but also as part of the additional parts 400. When the heat pipe 350 is used as part of the additional parts 400, the heat pipe 350 may be set on the front side of the primary panel 311.

It should be understood that the above-mentioned embodiments are merely exemplary and are not intended to limit the present disclosure. Those skilled in the art can make various transformations and changes to the above embodiments under the guidance of the present disclosure without departing from the scope of the present invention.

What is claimed is:

1. A manufacturing method of a multi-purpose heat sink, comprising:
   providing a platform part, wherein the platform part includes a bracket and heat dissipation components, and the bracket limits a frame of the platform part and includes a primary panel; and
   providing an additional part, wherein the additional part includes a plurality of types of convex plates,
      wherein at least part of the heat dissipation components are set on a back side of the primary panel of the bracket, and the plurality of convex plates are combined with a front side of the primary panel and are used for heat conduction in contact with heat dissipation sources of a corresponding circuit board assembly, the platform part is capable of receiving more than one type of convex plates,
   selecting one from the plurality of convex plates from multiple candidate convex plates for one of the heat dissipation sources according to an arrangement of the heat dissipation sources of the corresponding circuit board assembly,
      wherein the selected convex plate includes a flat surface in contact with a surface of a corresponding one of the heat dissipation sources, and
      wherein the flat surface of the selected convex plate is of a same shape as the surface of the corresponding one of the heat dissipation sources.

2. The manufacturing method of claim 1, wherein the platform part further includes a cover installed to a back side of the bracket, so that at least part of the heat dissipation components are clamped on the cover and the primary panel.

3. The manufacturing method of claim 1, wherein the heat dissipation components include heat fins.

4. The manufacturing method of claim 3, wherein the heat dissipation components further include a plurality of heat pipes, the heat fins include a first heat fin, wherein the plurality of heat pipes are set between the first heat fin and the primary panel, and the plurality of heat pipes are in contact with the first heat fin.

5. A multi-purpose heat sink, comprising:
   a platform part, wherein the platform part includes a bracket and heat dissipation components, and the bracket limits a frame of the platform part and includes a primary panel;
   multiple candidate convex plates; and
   an additional part, where the additional part includes a plurality of types of convex plates;
      wherein at least part of the heat dissipation components are set on a back side of the primary panel of the bracket,
      wherein one or more of the plurality of convex plates are selected from the multiple candidate convex plates for one of multiple heat dissipation sources according to an arrangement of the heat dissipation sources of a circuit board assembly,
      wherein the selected one or more convex plates are combined with a front side of the primary panel and are used for heat conduction in contact with the heat dissipation sources of the circuit board assembly; the platform part is capable of receiving more than one type of convex plates,
      wherein each of the selected convex plates includes a flat surface in contact with a surface of a corresponding one of the heat dissipation sources, and
      wherein the flat surface of each of the selected convex plate is of a same shape as the surface of the corresponding one of the heat dissipation sources.

6. A multi-purpose heat sink, comprising:
   a platform part, wherein the platform part includes a bracket and heat dissipation components, and the bracket limits a frame of the platform part and includes a primary panel;
   multiple candidate convex plates; and
   an additional part, wherein the additional part includes a plurality of types of convex plates,
      wherein at least part of the heat dissipation components are set on a back side of the primary panel of the bracket, and
      wherein one or more of the plurality of convex plates are selected from multiple candidate convex plates for one of multiple heat dissipation sources according to an arrangement of the heat dissipation sources of a circuit board assembly,
      wherein the selected one or more convex plates are welded or glued to a front side of the primary panel and are used for heat conduction in contact with the heat dissipation sources of the circuit board assembly,
      wherein each of the selected convex plates includes a flat surface in contact with a surface of a corresponding one of the heat dissipation sources, and
      wherein the flat surface of each of the selected convex plate is of a same shape as the surface of the corresponding one of the heat dissipation sources.

7. A multi-purpose heat sink platform, comprising:
   a bracket and heat dissipation components, wherein the bracket limits a frame of the platform part and includes a primary panel, and at least part of the heat dissipation components are set on a back side of the primary panel of the bracket;
   multiple candidate convex plates; and
   a front side of the primary panel is used to install a plurality of types of convex plates by welding or gluing,
      wherein one or more of the plurality of convex plates are selected from the multiple candidate convex plates for one of multiple heat dissipation sources according to an arrangement of the heat dissipation sources of a circuit board assembly, and the plurality of convex plates are used for heat conduction in contact with heat dissipation sources of a corresponding circuit board assembly,
      wherein each of the selected convex plates includes a flat surface in contact with a surface of a corresponding one of the heat dissipation sources, and
      wherein the flat surface of each of the selected convex plate is of a same shape as the surface of the corresponding one of the heat dissipation sources.

8. The manufacturing method of a multi-purpose heat sink of claim 1, wherein the plurality of convex plates are formed in multiple sizes and multiple thicknesses.

9. The manufacturing method of a multi-purpose heat sink of claim 1, wherein the selecting includes selecting one or more from the plurality convex plates according to positions of the heat dissipation sources of the corresponding circuit board assembly.

10. The multi-purpose heat sink of claim 5, wherein the plurality of convex plates are formed in multiple sizes and multiple thicknesses.

11. The multi-purpose heat sink of claim 5, wherein the one or more of the plurality of convex plates are selected according to positions of the heat dissipation sources of the corresponding circuit board assembly.

12. The multi-purpose heat sink of claim 6, wherein the plurality of convex plates are formed in multiple sizes and multiple thicknesses.

13. The multi-purpose heat sink of claim 6, wherein the one or more of the plurality of convex plates are selected according to positions of the heat dissipation sources of the corresponding circuit board assembly.

\* \* \* \* \*